United States Patent [15] 3,674,645
Blank et al. [45] July 4, 1972

[54] KERATINOLYTIC ENZYME ISOLATED FROM TRICHOPHYTON MENTAGORPHYTES AND PROCESS THEREFOR

[72] Inventors: Fritz Blank, Merion Station, Pa.; William C. Day, Edmonton, Alberta, Canada; Sandra R. Harmon, Norristown, Pa.; Pauline F. Toncic, Philadelphia, Pa.; Ruey J. Yu, Philadelphia, Pa.

[73] Assignee: Temple University, Philadelphia, Pa.

[22] Filed: Aug. 14, 1969

[21] Appl. No.: 850,260

[52] U.S. Cl. ........................................................195/66 R
[51] Int. Cl. .......................................................C12d 13/10
[58] Field of Search ..................195/4, 5, 6, 65, 66, 100, 102, 195/82

[56] References Cited

FOREIGN PATENTS OR APPLICATIONS 539,825  9/1941  Great Britain

OTHER PUBLICATIONS

Thurner, J. Chem. Abs., Vol. 65, No. 17417 g., 1966.
Weary et al., " Keratinolytic Activity..," J. Invest. Derm. Vol. 48, pp. 240– 248, 1967.
McConn et al., " Neutral Proteinase," J. Biol. Chem. Vol. 239 pp. 3706– 3715, 1964.
Dixon et al., Enzymes, 2nd ed, pp. 27– 51, 1964.
Yu et al., J. of Bact., Vol 96, pp. 1434– 1436, 1968.

Primary Examiner—A. Louis Monacell
Assistant Examiner—Gary M. Nath
Attorney—Paul & Paul

[57] ABSTRACT

Keratinase is produced by incubating *T. Mentagrophytes* for several days in growth medium, at a pH of 6–9, containing animal hair, magnesium salt, thiamine, pyridoxine and inositol. Preferably, glucose is also included and the pH is about 7.8. This keratinase is separated by filtering the growth media, partially purifying the enzyme by contact with diethylaminoethyl cellulose and adsorbing the keratinase on carboxymethyl cellulose. The crude keratinase is eluted from the cellulose and purified by molecular sieves, ion exchange resins or other means.

5 Claims, No Drawings

KERATINOLYTIC ENZYME ISOLATED FROM TRICHOPHYTON MENTAGORPHYTES AND PROCESS THEREFOR

INTRODUCTION

This invention pertains to a method for producing a highly keratinolytic enzyme and to the product of that process.

BACKGROUND OF THE INVENTION

Keratin is a sulfur containing protein which forms the chemical basis of such relatively insoluble and undigestible epidermal material as hair, nail, callus, horn, and feathers. An enzyme capable of digesting or solubilizing keratin may have both dermatological and industrial uses. Dissolving keratinous waste material or the removal of hair in the rendering of animal hides are typical of the possible industrial uses of such an enzyme. Dermatologically, this keratinolytic enzyme would find utility, for example, in the removal of calluses or the excessive keratin found in certain skin conditions, such as psoriasis.

It is the general object of the present invention to provide such an enzyme and a method for the production thereof.

BRIEF DESCRIPTION OF THE INVENTION

Active keratinase is produced by incubating *Trichophyton mentagrophytes* in an aqueous growth medium having a pH of 6–9 and comprising animal hair, a magnesium salt, thiamine, pyridoxine and inositol. Preferably, glucose is also included, the pH of the solution is about 7.8 and the animal hair in the growth medium is horse hair or guinea pig hair. The keratinolytic enzyme produced in this culture is best separated by first filtering the incubated medium, then contacting the filtrate with diethylaminoethyl cellulose, and, after adjusting the pH of the liquid to 6.5, adsorbing the enzyme on carboxymethyl cellulose. It is then eluted with a buffered ionic solution, dialyzed and lyophilized. The crude enzyme thus isolated is redissolved in buffered ionic solution and purified by molecular sieves, ion exchange resins or other similar means and again lyophilized. The product is highly keratinolytic, as shown by its ability to solubilize human callus tissue, horse hair and guinea pig hair.

DETAILED DESCRIPTION OF THE INVENTION

The present invention is particularly pointed out and distinctly claimed in the concluding portion of this specification. It may be better understood, however, together with the further objects and advantages thereof, by reference to the following detailed description. *Trichophyton mentagrophytes* var. *granulosum* (*T. granulosum* Sabouraud, 1909) is a known dermatophyte. Dermatophytes are parasitic fungi known to cause diseases such as ringworm in man and animals. The main pathogenic feature of dermatophytes is their ability to invade and thrive in the keratinized layers of skin, hair and nails. While this physiological property of dermatophytes has been known for some time, efforts to identify any particular dermatophyte or component thereof with specific keratinolytic activity have met with only limited success.

Keratinase is produced according to the present invention by inoculating a culture medium with *T. mentagrophytes*. Generally, the culture medium is composed of the following components in grams per liter of distilled water:

| | |
|---|---|
| Animal hair | 2.5 |
| Glucose | 0.9 |
| MgSO$_4$ | 0.6 |
| Thiamine hydrochloride | 0.01 |
| Pyridoxine hydrochloride | 0.01 |
| Inositol | 0.05 |

Na$_2$HPO$_4$·7H$_2$O (6.87 grams) and KH$_2$PO$_4$ (0.333 grams) are added to produce a buffered pH of 7.8. The animal hair, preferably either horse hair or guinea pig hair may be varied from about 1 to 6 grams. The magnesium concentration, about 5 millimole in the foregoing composition, may be varied within the range 1–10 millimoles. The buffered pH may be varied from 6 to 9.

After sterilization at 121° C and 15 psi for 20 minutes, the culture medium is inoculated with *T. mentagrophytes* and is kept in the dark for 5 days at 25° C. The culture medium is then shaken for 7 days and filtered.

Isolation of crude keratinase is accomplished by removing other components from the culture filtrate with diethylaminoethyl cellulose, adjusting the pH of the purified filtrate to 6.5, and adsorbing the enzyme from the filtrate on carboxymethyl cellulose. The enzyme is then eluted with an ionic solution, such as a sodium chloride solution buffered to a pH of 7.8 with phosphate salts, dialyzed and lyophilized. Purification of the keratinase is accomplished by dissolving the crude enzyme in an ionic solution, such as phosphate buffered salt solution, followed by gel filtration in a chromatographic separation column with a gel filtration agent such as Sephadex G–100 molecular sieve. Other suitable gel filtration agents include Sephadex G–50, G–75 and G–150 molecular sieves, carboxymethyl Sephadex and ion exchange resins. The Sephadex materials are available commercially from Pharmacia Fine Chemical of Sweden. The purified keratinase in solution is then again lyophilized.

The keratinolytic activity of the enzyme produced by the foregoing process and the enhancement thereof as it is purified is best illustrated by the following table in which the fluid volume, total keratinolytic activity and specific keratinolytic activity (keratinolytic activity per milligram enzyme in solution) are given for the fluid at each stage of the purification process. The keratinolytic activity is given in units based on spectrophotometric analysis of reaction fluids of guinea pig hair as digested by enzyme material.

PURIFICATION OF THE KERATINASE

| Volume Procedure (milliliters) | Total Activity (× 10³ KU) | Specific Activity (KU/mg) |
|---|---|---|
| (1) Culture Filtrate 27,000 | 7.30 | 1.35 |
| (2) DEAE-cellulose 27,000 | 8.14 | 4.02 |
| (3) CM-cellulose 15,000 | 2.88 | 6.03 |
| (4) Dialysis and Lyophilization 1,800 | 2.59 | 10.30 |
| (5) Gel Filtration (Final Product) 94 | 1.5 | 34.0 |

For purposes of comparison it should be noted that trypsin, a non-specific protease, tested by the procedure used in the above samples, exhibited a specific keratinolytic activity of 1.21.

In other tests of the keratinolytic properties of the keratinase of the present invention, the Kjeldahl method, based on the measurement of the increased nitrogen content in the solution, has been used to determine keratin digestion. In one such test, the keratin content of human callus material in a reaction solution of the keratinase of the present invention at 37° C and a pH of 7.0 was found to be 23.2 percent (by weight) digested after 6 hours and 31.9 percent digested after 14 hours.

The physicochemical characteristics of the keratinase of the present invention have been determined. Specifically, it has been found that the molecular weight of this material is on the order of 48,000, its isoelectric point is pH 9.4 and its elemental analysis, by weight is

| | |
|---|---|
| Carbon | 48.92% |
| Nitrogen | 15.30% |

| | |
|---|---|
| Hydrogen | 6.51% |
| Sulfur | 1.23% |
| Ash | 1.35% |

The amino acid composition of this keratinase in grams per 100 grams, is as follows:

| | |
|---|---|
| Alanine | 7.78 |
| Arginine | 8.02 |
| Aspartic acid | 14.40 |
| Half Cystine | 1.36 |
| Glutamic acid | 6.25 |
| Glycine | 6.90 |
| Histidine | 2.19 |
| Isoleucine | 4.67 |
| Leucine | 5.63 |
| Lysine | 3.37 |
| Methionine | 2.30 |
| Phenylalanine | 4.09 |
| Proline | 0.48 |
| Serine | 6.26 |
| Threonine | 7.10 |
| Tryptophan | 3.49 |
| Tyrosine | 4.95 |
| Valine | 5.48 |
| Amide | 1.57 |
| Total: | 96.29 |

The selective reactivity of the keratinase of the present invention in the hydrolyzation of peptides as detected by ninhydrin analysis on thin layer chromatograms has also been studied and the following are the amides, peptides or proteins which the keratinase has been found to hydrolyze or not hydrolyze as indicated below (bonds hydrolyzed by the keratinase are indicated by ┊ ).

Amides, Peptides or Proteins Hydrolyzed by Keratinase of the Present Invention

1. Leu ┊ β – (NH) Naph
2. Met ┊ β – (NH) Naph
3. N–CBZ–Ala ┊ Val·Me·ester
4. N–CBZ–α–Glu ┊ Tyr
5. Gly ┊ Leu
6. N–CBZ–Gly ┊ Leu
7. N–BZ–Gly ┊ Leu·NH$_2$
8. Gly ┊ D·L-Norleu
9. N–CBZ–Gly ┊ Phe·NH$_2$
10. Gly ┊ Tyr
11. Gly ┊ Tyr·NH$_2$
12. D·L–Leu ┊ Gly
13. Leu ┊ Leu
14. Leu ┊ Met
15. Leu ┊ Phe
16. Leu ┊ Tyr
17. Phe ┊ Gly
18. Phe ┊ Phe
19. Tyr ┊ Leu
20. N–CBZ–Val ┊ Leu·Me·ester
21. N–CBZ–Val ┊ Phe·Me·ester
22. N–CBZ–Val ┊ Tyr·Me·ester
23. D·L–Ala ┊ Gly–Gly
24. Gly ┊ Leu ┊ Tyr
25. Casein, Collagen, Elastin, Fibrin, Fibrinogen, Gelatin, Hemoglobin, Insulin and Ovalbumin Amides, Peptides or Polypeptides Not Hydrolyzed by Keratinase of the Present Invention 1. β–Ala-D·L–Leu
2. D·L–Ala–D·L–Ser
3. Gly–Glu
4. Gly–Gly
5. Gly–Lys
6. Gly–Phe
7. Gly–Pro
8. Gly–Ser
9. N–BZ–Gly–Gly
10. Gly–D·L–Val
11. N–CBZ–Leu–Ala·Me·ester
12. N–CBZ–Leu–Leu·NH$_2$
13. N–CBZ–Met–Gly·Et·ester
14. Ser–Gly
15. Tyr–Gly
16. N–BZ–Tyr–Gly·NH$_2$
17. N–CBZ–Tyr–Gly·NH$_2$
18. N–CBZ–Val–Ala·Me·ester
19. Val–Gly
20. N–CBZ–Ala–Gly–Gly
21. γ–Glu–Cys–Gly
22. N–CBZ–Pro–Leu–Gly·NH$_2$
23. Gly–Pro–Gly–Gly
24. Poly–Gly
25. Poly–Leu
26. Poly–Lys
27. Poly–Phe
28. β–Naphthylamides of:
   Ala–, Arg–, Asn–, α–Asp–, β–Asp–, α–Glu–, γ–Glu–, Gly–, His–, Hyp–, Ile–, Lys–, Orn–, Phe–, Pro–, Ser–, Thr–, Tyr– and Val–.

The foregoing describes the elemental and amino acid content and the reactivity of the enzyme produced in the present invention for purposes of future identification. Minor variations in these properties may be expected with slightly different forms of the present invention which nevertheless will be within its true spirit and scope.

The following is claimed:

1. A process including:
   a. preparing an aqueous growth medium consisting of a 1–10 millimole solution of a magnesium salt having a pH of 6–9 and further including (per liter solution):
      1–6 grams guinea pig hair or horse hair
      0.9 gram glucose
      0.01 gram thiamine hydrochloride
      0.01 gram pyridoxine hydrochloride
      0.05 gram inositol
   b. inoculating said growth medium with *Trichophyton mentagrophytes* var. *granulosum*,
   c. allowing said *T. mentagrophytes* to incubate in said medium for several days,
   d. filtering said inoculated, incubated medium,
   e. contacting the filtrate of said inoculated, incubated medium with diethylaminoethyl cellulose,
   f. separating the liquid fraction from the diethylaminoethyl cellulose and adjusting the pH of said liquid fraction to 6.5,
   g. contacting said liquid fraction with carboxymethyl cellulose,
   h. separating the liquid fraction from the carboxymethyl cellulose,
   i. eluting said carboxymethyl cellulose with an ionic solution having a pH of about 7.8,
   j. isolating crude keratinase from said ionic solution eluate by dialysis and lyophilization, and
   k. purifying said crude keratinase by redissolving it in an ionic solution and passing it through a chromatographic separation column containing a suitable gel filtration agent.

2. A process, as recited in claim 5, wherein said gel filtration agent in step (k) comprises molecular sieves.

3. A process for purifying a keratinolytic enzyme, comprising adsorbing said enzyme from a culture filtrate of *Trichophyton mentagraphytes* var. *granulosum* by contacting said filtrate first with diethylaminoethyl cellulose and then with carboxymethyl cellulose wherein said enzyme is further purified by eluting said carboxymethyl cellulose with a buffered solution containing sodium chloride in a concentration of from 0.5 to 5 mole and then dialyzing and lyophilizing the eluate from said sodium chloride solution.

4. A process for purifying a keratinolytic enzyme, as recited in claim 3, wherein the product of said dialyzation and lyophilization is further purified by gel filtration.

5. A process for purifying a keratinolytic enzyme, as recited in claim 4, wherein said gel filtration utilizes molecular sieves.

* * * * *

UNITED STATES PATENT OFFICE
CERTIFICATE OF CORRECTION

Patent No. 3,674,645          Dated July 4, 1972

Inventor(s) Fritz Blank et al

It is certified that error appears in the above-identified patent and that said Letters Patent are hereby corrected as shown below:

Column 2, line 47, delete "1,5000" and substitute therefore --- 1,500 ---.

Claim 2, line 1, delete "5" and substitute therefore --- 1 ---.

Signed and sealed this 31st day of October 1972.

(SEAL)
Attest:

EDWARD M. FLETCHER, JR.           ROBERT GOTTSCHALK
Attesting Officer          Commissioner of Patents